United States Patent
Liu et al.

(10) Patent No.: US 9,632,773 B2
(45) Date of Patent: Apr. 25, 2017

(54) SYSTEM, METHOD FOR CLEANING MEMORY SPACE AND TERMINAL DEVICE WITH MEMORY SPACE CLEANING FUNCTION

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hui-Feng Liu, Shenzhen (CN); Xin Lu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 8 days.

(21) Appl. No.: 14/718,753

(22) Filed: May 21, 2015

(65) Prior Publication Data

US 2016/0062700 A1 Mar. 3, 2016

(30) Foreign Application Priority Data

Sep. 1, 2014 (CN) .......................... 2014 1 0438495

(51) Int. Cl.
 *G06F 3/06* (2006.01)
 *G06F 9/00* (2006.01)
 *G06F 12/02* (2006.01)
(52) U.S. Cl.
 CPC .............. *G06F 9/00* (2013.01); *G06F 3/0629* (2013.01); *G06F 3/0631* (2013.01); *G06F 12/0223* (2013.01); *G06F 12/0261* (2013.01); *G06F 2212/1032* (2013.01); *G06F 2212/1044* (2013.01)

(58) Field of Classification Search
 CPC ............................ G06F 3/0629; G06F 3/0631
 USPC .................................................. 711/170, 171
 See application file for complete search history.

(56) References Cited

U.S. PATENT DOCUMENTS

| | | | |
|---|---|---|---|
| 2005/0138448 A1* | 6/2005 | Chew ............................ | 713/300 |
| 2010/0042864 A1* | 2/2010 | Sip ................................ | 713/501 |
| 2011/0269514 A1* | 11/2011 | Ge ................................. | 455/574 |
| 2013/0275915 A1* | 10/2013 | Wang ............................ | 715/810 |
| 2015/0365306 A1* | 12/2015 | Chaudhri et al. ............. | 715/736 |

* cited by examiner

*Primary Examiner* — Than Nguyen
(74) *Attorney, Agent, or Firm* — Steven Reiss

(57) ABSTRACT

A method for cleaning memory space includes marking an application of a terminal device when that application is launched in response to a launching operation, loading each marked application to an application resource pool of the terminal device, counting a total number of marked times of each application in the application resource pool, determining if the total number of marked times of each application in the application resource pool is greater than or equal to a predetermined number of times, determining the applications, which have a total number of marked times greater than or equal to the predetermined number of times, in the application resource pool, as non-removable applications and determining other applications of the terminal device as removable applications, and cleaning the memory space occupied by the removable applications when available memory space of the terminal device is not enough.

12 Claims, 2 Drawing Sheets

SYSTEM, METHOD FOR CLEANING MEMORY SPACE AND TERMINAL DEVICE WITH MEMORY SPACE CLEANING FUNCTION

CROSS-REFERENCE TO RELATED APPLICATIONS

This application claims priority to Chinese Patent Application No. 201410438495.6 filed on Sep. 1, 2014, the contents of which are incorporated by reference herein.

FIELD

The subject matter herein generally relates to data management.

BACKGROUND

Nowadays, the use of intelligent terminal devices, such as a mobile phone or a tablet computer is increased, more and more applications are installed in the intelligent terminal device. However, installing many applications occupies a large amount of memory space.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
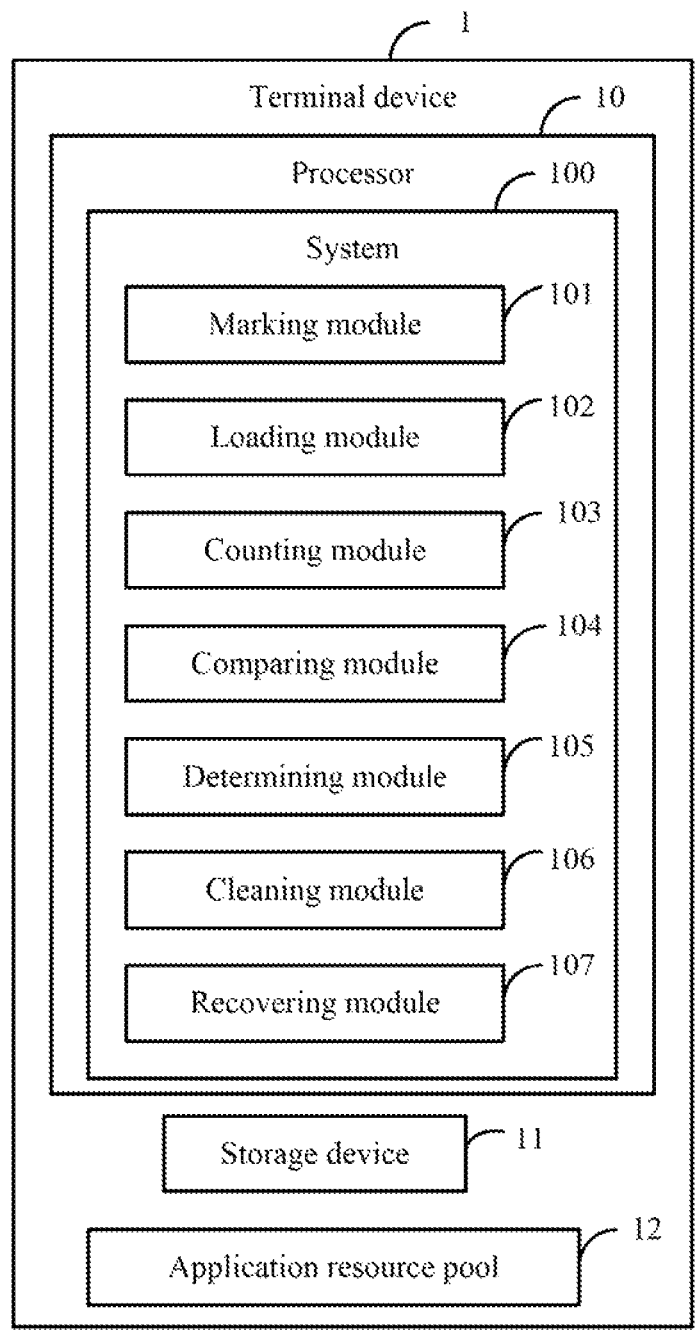
FIG. 1 is a block diagram of one embodiment of a running environment of a system for cleaning memory space.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of a running environment of a system 100 for cleaning memory space. The system 100 runs on a terminal device 1, and is used for cleaning memory spaces of the terminal device 1. In one embodiment, the terminal device 1 can be a smart phone, a tablet computer, a personal digital assistant (PDA), or other suitable terminal device. A number of applications are installed in the terminal device 1, and the terminal device 1 includes, but is not limited to, a processor 10, a storage device 11, and an application resource pool 12. The application resource pool 12 is used to store applications that have been launched by users. The number of applications and the application resource pool 12 are stored in the storage device 11.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 10 can be a central processing unit (CPU), a microprocessor, or other data processor chip that performs functions of the system 100 for cleaning memory space in the terminal device 1.

Referring to the FIG. 1, in at least one embodiment, the system 100 can include a marking module 101, a loading module 102, a counting module 103, a comparing module 104, a determining module 105, a cleaning module 106, and a recovering module 107. The modules 101-107 of the system 100 can be collections of software instructions stored in the storage device 11 of the terminal device 1 and executed by the processor 10 of the terminal device 1. The modules 101-107 of the system 100 also can include functionality represented as hardware or integrated circuits, or as software and hardware combinations, such as a special-purpose processor or a general-purpose processor with special-purpose firmware.

The marking module 101 is used to mark an application of the terminal device 1 when that application is launched in response to a launching operation, such as clicking or double-clicking on an icon of the application. In one embodiment, the storage device 11 of the terminal device 1 further stores an event viewer. The event viewer is used to record the information generated by each event of the applications in the terminal device 1. For example, the events concerning an applications can include, but not limited to, launching event, closing event, error event, warning event. Accordingly, the generated information would thus include launching information, closing information, error information, and warning information. The marking module 101 further can determine whether an application is launched by checking the event viewer, and if it has been launched, mark the launched application.

The loading module 102 is used to load each application marked by the marking module 101 to the application resource pool 12 of the terminal device 1. In the embodiment, the loading module 102 loads each marked application to the application resource pool 12 at a first time when the application is marked. The application resource pool 12 is a storage space of the storage device 11, such as a directory, and loading the marked applications to the particular directory separates the unmarked applications from the marked applications.

The counting module 103 is used to count a total number of marked times of each application in the application resource pool 12. In detail, when each application is launched, the counting module 103 increases a total number of marked times of an application by one to update the total number of marked times. The counting module 103 can thereby count the total number of marked times of the application.

The comparing module 104 is used to determine if the total number of marked times of each application in the application resource pool 12 is greater than or equal to a predetermined number of times. In the embodiment, the predetermined number of times can be thirty, and the comparing module 104 determines if the total number of marked times of one application is greater than or equal to thirty. In other embodiment, the predetermined number of times can be changed to any other values.

The determining module 105 is used to determine the applications, which have a total number of marked times greater than or equal to the predetermined number of times, in the application resource pool 12, as non-removable applications and determine other applications of the terminal device 1 as removable applications. In the embodiment, the applications which have a marked times totals greater than or equal to the predetermined number of times are regarded as frequently used applications. Such applications cannot be removed during a process of cleaning memory space. The applications in the application resource pool 12, with marked times totals less than the predetermined number of times, and the applications which are not stored in the application resource pool 12, can be removed during the process of cleaning memory space.

The cleaning module 106 is used to clean the memory space occupied by the removable applications when available memory space of the terminal device 1 is not enough. In detail, the cleaning module 106 can detect available memory space of the terminal device 1 in real time. When the detected available memory space is not enough, for example, when the detected available memory space is less than a predetermined value, the cleaning module 106 removes the removable applications to release memory space. In the embodiment, the removable applications are those applications in the application resource pool 12 which have marked times totals less than the predetermined number of times, and the applications not stored in the application resource pool 12. In the embodiment, the cleaning module 106 removes the applications by uninstalling the applications.

In one embodiment, the cleaning module 106 is also used to clean the memory space occupied by the removable applications in response to a request to clean memory space input by the user. Therefore, besides cleaning memory space automatically based on the size of the available memory space, the cleaning module 106 also can clean memory space in response to the user request. The user can input the request to clean memory space to the terminal device 1 anytime, the cleaning module 106 accordingly removes the removable applications.

The recovering module 107 is used to reinstall the applications which have been removed within a predetermined time period in response to a recovering request input by the user. In detail, some applications with marked times totals less than the predetermined number of times are removable, but if the user would like to reserve such applications in the terminal device 1, the user can input the recovering request to immediately recover these applications when finding out such applications are removed.

In detail, after the cleaning module 106 removes some applications, the storage device 11 records the removed applications for the predetermined time period. The recordings include identification information of the removed applications, for example, a name and size of the removed applications. When the applications that the user would like to reserve are removed, the users can input the recovering request to recover such applications within the predetermined time period. The recovering module 107 then reinstalls the removed applications in response to the recovering request according to the recordings. In the embodiment, the predetermined period of time is five minutes, in other embodiment, the predetermined time can be changed to other values if necessary, such as 1 hour.

The determining module 105 is further used to determine the reinstalled application as the non-removable application. In the embodiment, even if the marked times of a reinstalled application totals less than the predetermined number of times, but that application has been reinstalled by the recovering module 107, that application is determined as the non-removable application, and this avoids such an application being removed when cleaning memory space at the next time.

Figure 2:
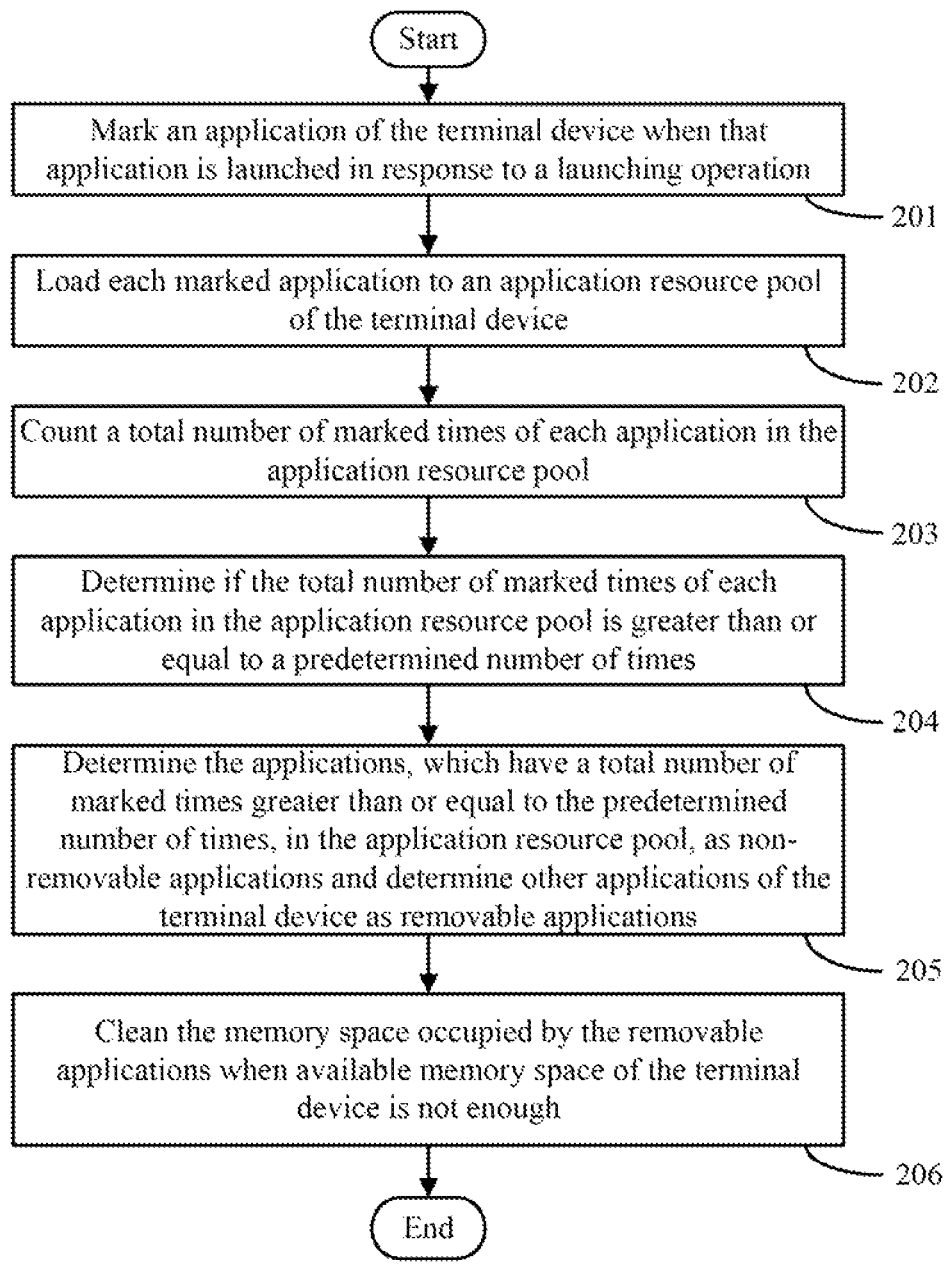
FIG. 2 illustrates a flowchart of one embodiment of a method for cleaning memory space.

FIG. 2 illustrates a flowchart of a method for cleaning memory space. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, a marking module marks an application of a terminal device when that application is launched in response to a launching operation.

At block 202, a loading module loads each application marked by the marking module to an application resource pool of the terminal device.

At block 203, a counting module counts a total number of marked times of each application in the application resource pool.

At block 204, a comparing module determines if the total number of marked times of each application in the application resource pool is greater than or equal to a predetermined number of times.

At block 205, a determining module determines the applications, which have a total number of marked times greater than or equal to the predetermined number of times, in the application resource pool, as non-removable applications and determines other applications of the terminal device as removable applications.

At block 206, a cleaning module cleans the memory space occupied by the removable applications, when available memory space of the terminal device is not enough.

In the embodiment, the method further includes the cleaning module cleaning the memory space occupied by the removable applications in response to a request to clean memory space input by the user.

The method further includes a recovering module reinstalling the applications which have been removed within a predetermined time period, in response to a recovering request input by the user.

The method further includes the determining module further determining the reinstalled application as the non-removable application.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A system for cleaning memory space, on a terminal device, the system comprising:
   at least one processor; and
   a plurality of modules which are collections of instructions executable by the at least one processor, the plurality of modules comprising:
   a marking module configured to, upon execution by the at least one processor, cause the at least one processor to mark an application of the terminal device when that application is launched in response to a launching operation;
   a loading module configured to, upon execution by the at least one processor, cause the at least one processor to load each application marked by the marking module to an application resource pool of the terminal device;
   a counting module configured to, upon execution by the at least one processor, cause the at least one processor to count a total number of marked times of each application in the application resource pool;
   a comparing module configured to, upon execution by the at least one processor, cause the at least one processor to determine if the total number of marked times of each application in the application resource pool is greater than or equal to a predetermined number of times;
   a determining module configured to, upon execution by the at least one processor, cause the at least one processor to determine the applications, which have a total number of marked times greater than or equal to the predetermined number of times, in the application resource pool, as non-removable applications and determine other applications of the terminal device as removable applications;
   a cleaning module configured to, upon execution by the at least one processor, cause the at least one processor to clean the memory space occupied by the removable applications when available memory space of the terminal device is not enough; and
   a recovering module configured to, upon execution by the at least one processor, cause the at least one processor to reinstall the applications which have been removed within a predetermined time period in response to a recovering request input by the user.

2. The system according to claim 1, wherein the cleaning module is further configured to, upon execution by the at least one processor, cause the at least one processor to clean the memory space occupied by the removable applications in response to a request to clean memory space input by the user.

3. The system according to claim 1, wherein the determining module is further configured to, upon execution by the at least one processor, cause the at least one processor to determine the reinstalled application as the non-removable application.

4. The system according to claim 1, wherein the terminal device can be a smart phone, a tablet computer, or a personal digital assistant.

5. A method for cleaning memory space, on a terminal device, the method comprising:
   marking an application of the terminal device when that application is launched in response to a launching operation;
   loading each marked application to an application resource pool of the terminal device;
   counting a total number of marked times of each application in the application resource pool;
   determining if the total number of marked times of each application in the application resource pool is greater than or equal to a predetermined number of times;
   determining the applications, which have a total number of marked times greater than or equal to the predetermined number of times, in the application resource pool, as non-removable applications and determining other applications of the terminal device as removable applications;
   cleaning the memory space occupied by the removable applications when available memory space of the terminal device is not enough; and
   reinstalling the applications which have been removed within a predetermined time period in response to a recovering request input by the user.

6. The method according to claim 5, wherein the method further comprises:
   cleaning the memory space occupied by the removable applications in response to a request to clean memory space input by the user.

7. The method according to claim 5, wherein the method further comprises:
   determining the reinstalled application as the non-removable application.

8. The method according to claim 5, wherein the terminal device can be a smart phone, a tablet computer, or a personal digital assistant.

9. A terminal device with a memory space cleaning function, comprising:
   a storage device storing a plurality of applications, an application resource pool and a plurality of modules which are collections of instructions, and
   at least one processor configured to execute the plurality of modules, the plurality of modules comprising:
   a marking module configured to, upon execution by the at least one processor, cause the at least one processor to mark an application of the terminal device when that application is launched in response to a launching operation;
   a loading module configured to, upon execution by the at least one processor, cause the at least one processor to load each application marked by the marking module to the application resource pool;

a counting module configured to, upon execution by the at least one processor, cause the at least one processor to count a total number of marked times of each application in the application resource pool;

a comparing module configured to, upon execution by the at least one processor, cause the at least one processor to determine if the total number of marked times of each application in the application resource pool is greater than or equal to a predetermined number of times;

a determining module configured to, upon execution by the at least one processor, cause the at least one processor to determine the applications, which have a total number of marked times greater than or equal to the predetermined number of times, in the application resource pool, as non-removable applications and determine other applications of the terminal device as removable applications;

a cleaning module configured to, upon execution by the at least one processor, cause the at least one processor to clean the memory space occupied by the removable applications when available memory space of the terminal device is not enough; and a recovering module configured to, upon execution by the at least one processor, cause the at least one processor to reinstall the applications which have been removed within a predetermined time period in response to a recovering request input by the user.

10. The terminal device according to claim 9, wherein the cleaning module is further configured to, upon execution by the at least one processor, cause the at least one processor to clean the memory space occupied by removable applications in response to a request to clean memory space input by the user.

11. The terminal device according to claim 9, wherein the determining module is further configured to, upon execution by the at least one processor, cause the at least one processor to determine the reinstalled application as the non-removable application.

12. The terminal device according to claim 9, wherein the terminal device can be a smart phone, a tablet computer, or a personal digital assistant.

* * * * *